Jan. 19, 1960 — J. H. MILLER — 2,922,110
MULTI-RANGE A.C. AMMETER
Filed Oct. 25, 1957 — 2 Sheets-Sheet 1

JOHN H. MILLER
INVENTOR.

BY
ATTORNEY

Jan. 19, 1960
J. H. MILLER
2,922,110
MULTI-RANGE A.C. AMMETER
Filed Oct. 25, 1957
2 Sheets-Sheet 2
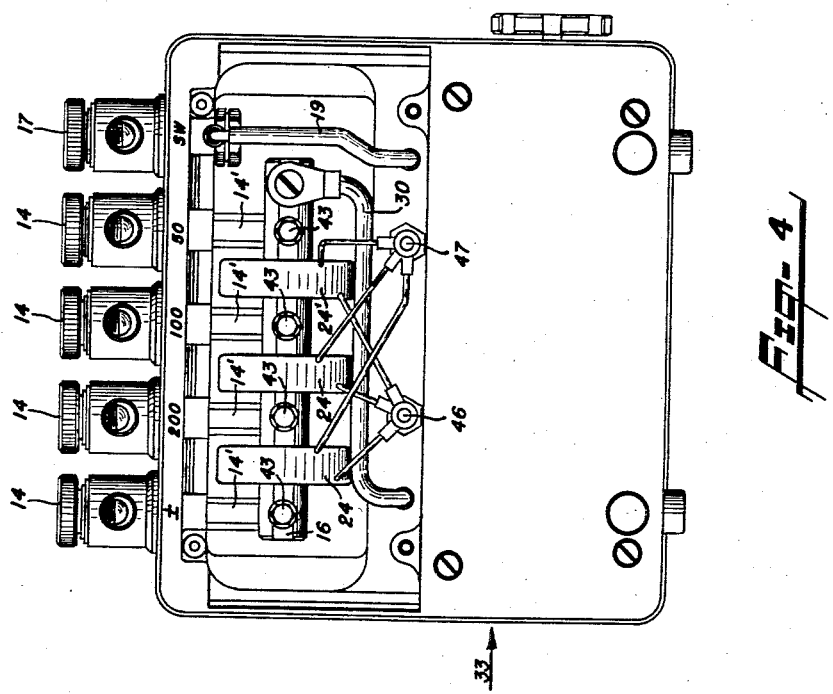
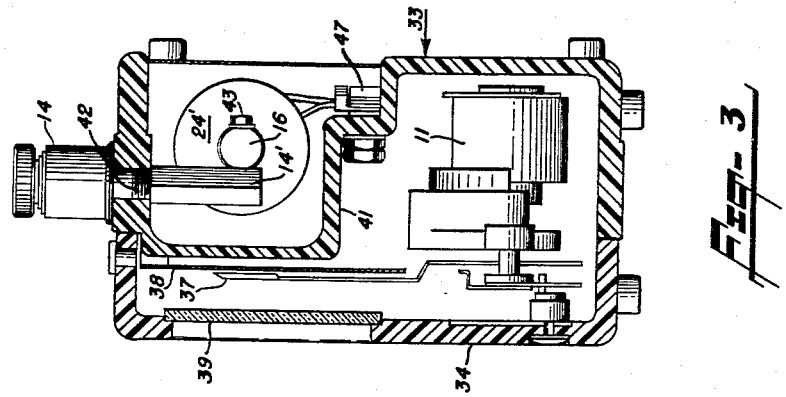
JOHN H. MILLER
INVENTOR.

United States Patent Office 2,922,110
Patented Jan. 19, 1960

2,922,110

MULTI-RANGE A.C. AMMETER

John H. Miller, Short Hills, N.J., assignor, by mesne assignments, to Daystrom, Incorporated, Murray Hill, N.J., a corporation of New Jersey Application October 25, 1957, Serial No. 692,333

4 Claims. (Cl. 324—115)

This invention relates to an electrical network and more particularly to a multi-range instrument network for use with an A.-C. instrument whereby the instrument may be adapted for the measurement of a wide range of input currents.

The ordinary multi-range transformer-type ammeter utilizes a range network comprising a transformer having a single transformer core with a plurality of windings thereon. By utilizing various combinations of windings, the instrument may be made to measure a wide range of current values. Such a system, which utilizes a multiplicity of windings is, however, inherently difficult of assembly requiring many man-hours for properly assembling and wiring the same.

In the novel multi-range alternating current ammeter of my invention the assembly time is greatly reduced by the use of a plurality of toroidal cores some, or all, of which may be provided with identical windings. The core windings comprise secondary transformer windings; the transformer primary comprising a conductor bus-bar of copper, or the like, extending through the cores and supporting the same. Terminals, or terminal extensions, are bolted, or otherwise suitably secured to the primary bus-bar at spaced distances apart, and the cores located between the spaced terminals. All of the core secondary windings are connected in parallel to a suitable A.-C. instrument. The simplicity of the mechanical mounting of the transformer cores on a single bus-bar, or generally rigid conductor, carrying the primary current to be measured, and the simplicity of wiring the secondary windings in shunt relation are highly desirable, and result in production savings. In addition, the instrument is versatile since terminals and cores are easily added or left off the heavy primary conductor.

Further, with my novel arrangement, the total instrument losses are less than in contemporary multi-range instruments since the primary winding comprises a large bus-bar of conducting material.

An object of this invention is the provision of an electrical circuit network which may be used in conjunction with an electrical meter whereby a multi-range instrument results.

An object of this invention is the provision of an electrical circuit network for use with an A.-C. electrical meter whereby the meter is adapted for current measurements of various ranges.

An object of this invention is the provision of a multi-range alternating current instrument comprising an A.-C. ammeter, a plurality of spaced terminals, a primary bar attached to the said terminals, a plurality of generally cylindrical cores each having a secondary winding thereon and mounted on the said primary bar between the said terminals, and means connecting the said secondary windings in shunt and to the said A.-C. ammeter.

An object of this invention is the provision of an electrical circuit network for use in a multi-range alternating current instrument for the measurement of current sources of various ranges comprising, a primary bus bar, a plurality of terminals attached to the said bus-bar, a plurality of magnetic cores of generally cylindrical shape mounted on the said primary bus-bar between the said terminals, each of the said magnetic cores having a secondary winding thereon, and means connecting the said secondary windings to an alternating current meter in shunt relation.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

Figure 3 is a vertical sectional view of the instrument taken on line 3—3 of Figure 2; and Figure 4 is a rear elevational view, with the rear cover plate removed, of the instrument.

Figures 1, 2:
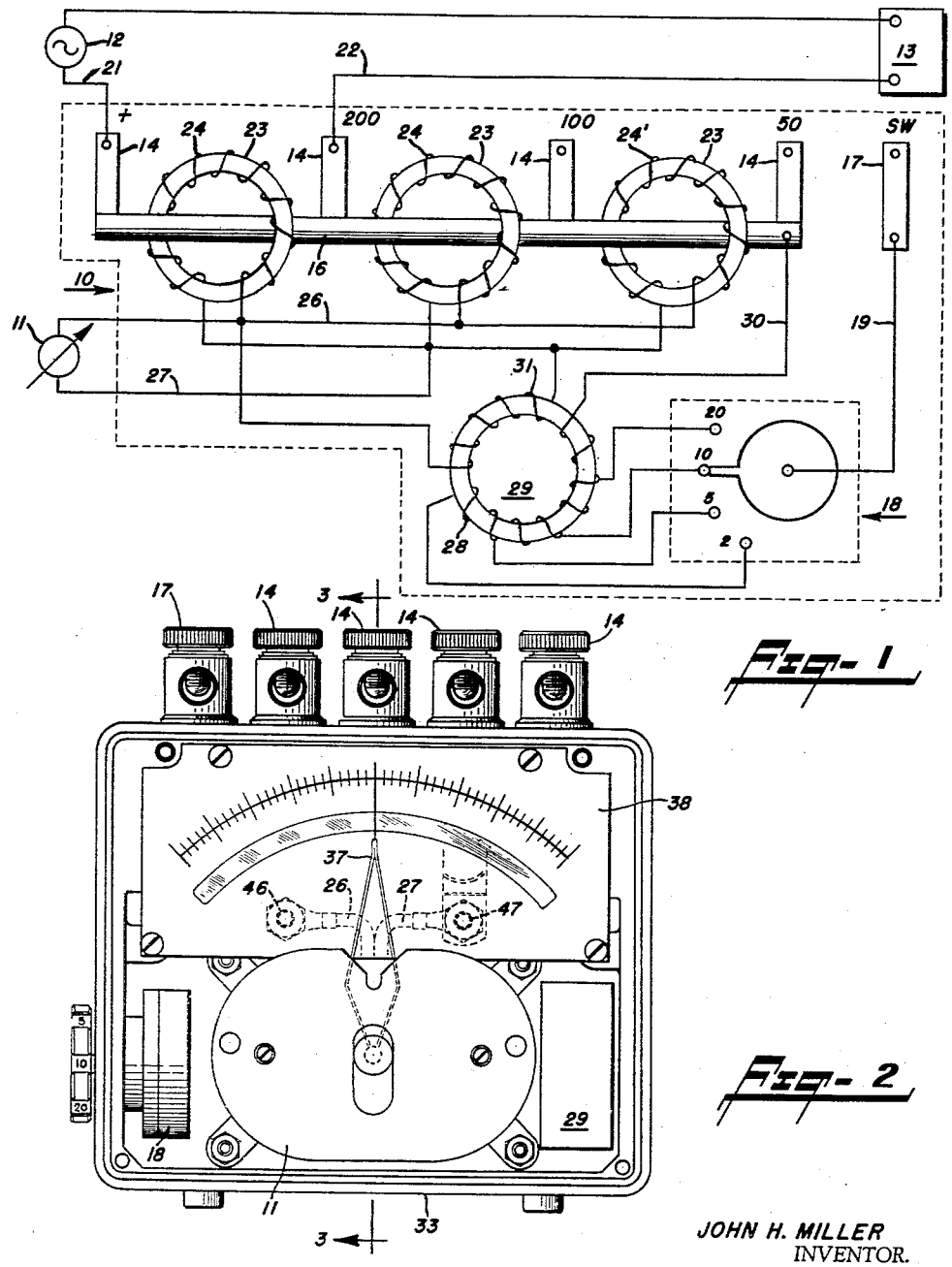
Figure 1 is a schematic circuit diagram of my novel multi-range instrument.
Figure 2 is a front elevational view of an instrument embodying my invention, as seen with the cover removed.

Reference is first made to Figure 1 of the drawings wherein a schematic circuit diagram of my novel multi-range network, designated by the reference numeral 10, is shown connected to an A.-C. meter 11 of any suitable type, such as an iron vane, electrodynamometer, rectifier type, or the like. The meter 11 which is of any suitable range, is described hereinbelow as a 5 ampere movement meter, for purposes of description only, since any range of meter may be used. The resulting A.-C. instrument, which comprises my novel multi-range network 10 and the ammeter 11, is shown connected for the measurement of the current delivered from an A.-C. current cource 12 to a load 13.

The multi-range network of my invention comprises a plurality of terminal members 14 suitably secured to a primary bus-bar 16 at spaced distances therealong. The terminals 14 are designated ±, 200, 100 and 50; ± being the common terminal, and the others designating various current ranges. An additional terminal 17 is provided which is marked SW and is connected to a range switch designated 18, through a lead wire 19. In the schematic drawing, the lead wire 21 from the A.-C. generator 12 is connected to the common ammeter terminal while the lead wire 22 is shown connected to the 200 ampere terminal. (For different range connections. the lead wire 22 may be connected to the 100, 50 or SW terminals, as necessary, or desired.)

Toroidal core members 23 are suitably mounted on the primary bus-bar 16 between adjacent terminals 14. Each of the core members is provided with a secondary winding, designated 24, 24 and 24'; the windings 24 each comprising 40 turns and the winding 24' comprising 20 turns for the purpose of obtaining the designated 200, 100 and 50 ampere ranges with a 5 ampere meter movement, as explained in detail below. All of the secondary windings are connected in shunt relation and to the A.-C. meter 11 through leads 26 and 27.

The SW terminal, designated by the reference numeral 17, is connected through the switch 18 to a tapped primary winding 28 of a transformer 29. One end of the primary winding 28 is connected through a lead wire 30 to the bus-bar 16. The transformer secondary winding 31 is connected to the meter 11 in parallel with the secondary windings 24, 24 and 24' on the cores 23. The numerals adjacent the switch terminals of the switch 18 indicate current ranges measurable with the instrument when the lead wire 22 is connected to the SW terminal.

The resulting low range scales of 20, 10, 5 and 2 amperes provided by the switch 18 and transformer 29 are thus obtained in a conventional manner by utilizing the proper turns ratio on the transformer 29, and need not be described in further detail.

In operation, for measurement on the 200 ampere range, the main current flows in the bus-bar 16 between the terminals 14 designated ± and 200. With 40 turns on the core 23 mounted between these terminals, 5 amperes will flow in the associated secondary winding 24 if 200 amperes are supplied by the generator 12 to the load 13. With a 5 ampere meter movement, full scale deflection is obtained under the above conditions. Since the primary winding of the other transformers is open, the impedance of the other secondary windings, 24, 24' and 31, is very high with respect to the impedance of the meter 11, and these shunted secondaries do not materially affect the amount of current flowing through the instrument mechanism winding. Actual laboratory tests show that each additional secondary connected across the meter shunts ¼ of 1% from the instrument mechanism; in final calibration this minor error is adjusted for and the final calibration is thus made completely accurate.

With connection made to the common and 100 ampere terminals, the main current flows through two of the transformers with the primaries effectively in series and the secondaries in parallel. Since each of the secondaries 24 are provided with 40 turns, the secondary currents will add to supply 5 amperes to the meter 11 with a 100 ampere primary current.

Similarly, for 50 amperes, with the lead wire 22 connected to the 50 ampere terminal, the primary current flows through three of the transformers with the primaries in series and the secondaries in parallel. Since the winding 24' is of 20 turns, this secondary will provide 2.5 amperes while the other two secondaries will provide 1.25 amperes for a total of 5 amperes; with 50 amperes in the series connected primaries.

It will be understood, by those skilled in this art, that the core 23 with the 20 turn winding 24' may be replaced by two cores each having a secondary winding of 40 turns, identical to the windings 24. With all of the secondaries connected in parallel, it will be apparent that the two 40 turn secondaries positioned between the 100 and 50 ampere terminals function as the single core having 20 turns.

With connection made to the common and switch terminals SW, the switch 18 and transformer 29 provide current ranges of 20, 10, 5 and 2 amperes in the normal manner.

It will be understood that any desired number of cores 23 and terminals 14 may be added to a bus-bar 16 of suitable length to provide an instrument network having other current ranges. It has been found that with conventional construction using a single transformer with a plurality of windings, that the copper loss in the windings represents the major portion of the loss; in a specific instance being some 4 to 10 times the loss in the instrument mechanism proper. By using my bus-bar arrangement where the primary conductor is large in section and short in length, the total loss at the terminals is materially reduced, being less than ⅓ that of conventional construction using a tapped wound transformer.

The simplicity of arrangement of my novel multi-range A.-C. ammeter network will be more apparent from an examination of Figures 2 to 4 of the drawings, and the following description thereof. In Figures 2 through 4, an instrument is shown which includes my multi-range network and an A.-C. ammeter. Referring, then, to Figures 2 through 4, the reference numeral 33 identifies an instrument case made of insulating material having a cover 34 secured to the front thereof and a rear cover plate 36 secured to the rear thereof, as seen in Figure 3. The A.-C. ammeter 11 is suitably mounted in the casing by means not shown in the drawings. The ammeter is provided with a pointer 37 which is movable over a scale plate 38 having a suitable scale thereon. A transparent window 39 is secured to the cover 34 over an aperture therein above the scale.

The case, as seen in Figure 3, is divided into a meter compartment and range network compartment by means of a dividing wall 41 formed integrally with the casing, within which the meter 11 and network 10, respectively, are mounted. The terminals 14 are provided with threaded studs 42 which extend through holes in the upper casing wall. Terminal extension members 14' are threaded to the studs 42, and extend downwardly within the range network compartment of the case. The bus-bar 16 is secured adjacent the lower end of the terminal extension members 14' by bolts 43, or any other suitable means. The transformer cores 23 with the secondary windings 24, 24 and 24' wound thereon are secured to the bus-bar 16 between adjacent terminals. The wound transformer cores may be secured to the bus-bar by dipping them in a suitable potting compound, such as liquid rubber, placing them on the bus-bar, and allowing them to dry, or harden. Any other suitable means may, obviously, be used, if desired.

All of the secondary leads from the transformers are connected in parallel to through terminals 46 and 47 secured to a vertical section of the dividing wall 41. The leads 26 and 27, as seen in Figure 2, connect the terminals 46 and 47 to the meter 11 within the meter compartment of the case.

As seen in Figures 2 and 4, the switch 18 is provided with a suitable handle, or knob, mounted upon a shaft extending from the side of the case. The knob may be suitably indexed with the current ranges. The transformer 29 is mounted in the casing on the side opposite the switch.

The simplicity of mounting the wound cores 23 on the bus-bar 16 results in an instrument of low assembly cost. Further, the parallel connection of the secondary windings to the terminals 46 and 47 and thence to the meter 11, is simple and easily performed; a minimum of skill being required. The bus-bar 16, is, obviously, easily bolted to the terminal extensions 14'.

Not only is my novel range network mechanically simple, but it is also versatile. Obviously, transformer cores having a different number of secondary turns may be used for instruments having different ranges. Further, if more, or fewer, ranges are necessary, the mounting arrangement is capable of being easily changed to include more, or a lesser number of wound transformer cores on the bus-bar, and with an accompanying increase, or decrease of terminals 14, if desired.

Having now described my invention in detail in accordance with the patent statutes, various other changes and modifications will suggest themselves to those skilled in this art, and it is intended that such changes and modifications shall fall within the spirit and scope of the invention as recited in the following claims.

I claim:

1. An electrical instrument multi-range network for use with an A.-C. ammeter for A.-C. current measurements comprising, a primary bus-bar, a plurality of terminals electrically connected to the primary bus-bar at spaced distances therealong, a plurality of generally toroidal cores each having a secondary winding thereon and surrounding the said primary bus-bar at spaced distances therealong with at least one core between each pair of adjacent terminals, and means connecting the said secondary windings in shunt to the said A.-C. ammeter, the A.-C. current to be measured being connected to selected pairs of terminals to thereby induce an output current in a selected number of the said cores surrounding the primary bus-bar.

2. The invention as recited in claim 1 wherein the terminals are bolted to the primary bus-bar.

3. A multi-range A.-C. ammeter for the measurement of current comprising a plurality of spaced toroidal cores each having a secondary winding thereon, a generally rigid current conductor extending through the toroidal cores, means connecting the said secondary windings in shunt, an A.-C. meter, means connecting the said meter to the said shunt-connected secondary windings, and a plurality of spaced terminals electrically connected to the generally rigid current conductor at spaced distances therealong with at least one terminal connected between a pair of adjacent cores and one adjacent each end of the said generally rigid current conductor.

4. The invention as recited in claim 3 wherein the terminals are bolted to the said generally rigid current conductor.

References Cited in the file of this patent

UNITED STATES PATENTS

| | | |
|---|---|---|
| 1,800,474 | Scherer | Apr. 14, 1931 |
| 2,251,373 | Olsson | Aug. 5, 1941 |
| 2,543,622 | Edwards | Feb. 27, 1951 |

FOREIGN PATENTS

| | | |
|---|---|---|
| 717,707 | Great Britain | Nov. 3, 1954 |